United States Patent
Roberts et al.

(10) Patent No.: US 11,023,723 B2
(45) Date of Patent: Jun. 1, 2021

(54) OPTICAL PUF AND OPTICAL READING OF A SECURITY ELEMENT

(71) Applicant: QUANTUM BASE LIMITED, Stockport (GB)

(72) Inventors: Jonathan David Roberts, Lancaster (GB); Robert James Young, Lancaster (GB)

(73) Assignee: QUANTUM BASE LIMITED, Stockport (GB)

( * ) Notice: Subject to any disclaimer, the term of this patent is extended or adjusted under 35 U.S.C. 154(b) by 0 days.

(21) Appl. No.: 16/494,801

(22) PCT Filed: Jul. 26, 2017

(86) PCT No.: PCT/GB2017/052181
§ 371 (c)(1),
(2) Date: Sep. 17, 2019

(87) PCT Pub. No.: WO2018/167448
PCT Pub. Date: Sep. 20, 2018

(65) Prior Publication Data
US 2020/0210697 A1  Jul. 2, 2020

(30) Foreign Application Priority Data
Mar. 17, 2017 (GB) ..................................... 1704308

(51) Int. Cl.
*G06K 15/00* (2006.01)
*G06K 9/00* (2006.01)
(Continued)

(52) U.S. Cl.
CPC .......... *G06K 9/00577* (2013.01); *G02B 5/20* (2013.01); *G06K 19/0614* (2013.01);
(Continued)

(58) Field of Classification Search
None
See application file for complete search history.

(56) References Cited

U.S. PATENT DOCUMENTS 9,495,626 B2 * 11/2016 Kulikovska ............ B42D 25/45
2007/0125857 A1 * 6/2007 Tuyls .................... H04L 9/3278
235/454

(Continued)

FOREIGN PATENT DOCUMENTS

| EP | 1687759 | 8/2006 |
| GB | 2537543 A | 10/2016 |
| WO | 2005048179 A1 | 5/2005 |

OTHER PUBLICATIONS

International Search Report and Written Opinion issued in connection with corresponding PCT Patent Application No. GB1704308.4 dated Apr. 24, 2017, 2 pages.
(Continued)

*Primary Examiner* — Dung D Tran
(74) *Attorney, Agent, or Firm* — Hoffman Warnick LLC

(57) ABSTRACT

According to a first aspect of the present invention, there is provided a method of determining a unique identifier for a security element, the method comprising: optically reading the security element via a configurable optical filter system, a readable optical transmission property of the filter system varying with respect to a configuration of the filter system; the reading comprising determining data indicative of an optical property of the security element at a first configuration of the filter system, and determining data indicative of an optical property of the security element at a second, different, configuration of the filter system; and the unique identifier being determined from a map of the variation in determined data indicative of an optical property with respect to the configuration of the filter system, wherein the reading is undertaken for multiple locations across the
(Continued)

Figure 1:
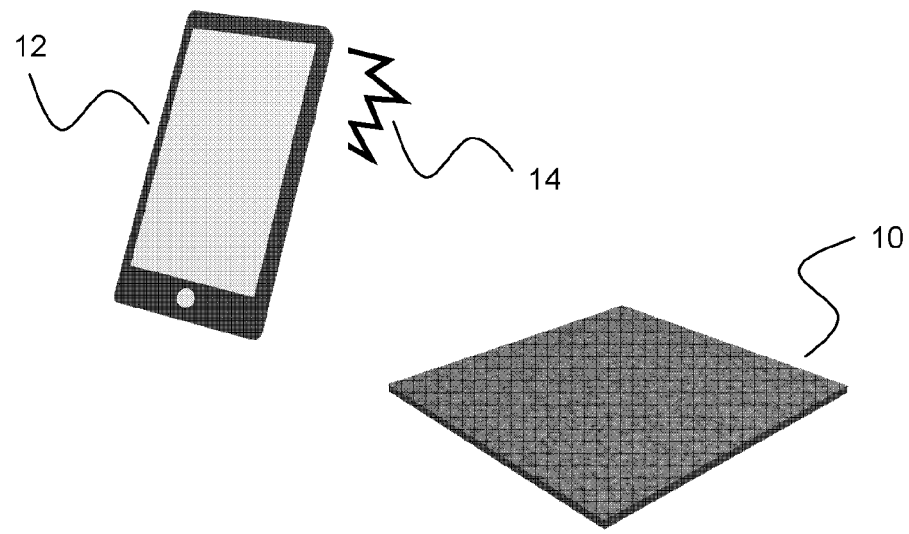

security element at the or each configuration of the filter system, such that the map is a map of the variation in determined data indicative of an optical property across the security element with respect to the configuration of the filter system, and wherein the reading for multiple locations across the security element is undertaken in a single reading step, using a reader with a two-dimensional sensor.

21 Claims, 11 Drawing Sheets

(51) Int. Cl.

| | | |
|---|---|---|
| *G02B 5/20* | (2006.01) | |
| *G06K 19/06* | (2006.01) | |
| *G06K 19/14* | (2006.01) | |
| *G06K 19/16* | (2006.01) | |
| *G07D 7/12* | (2016.01) | |
| *G09C 1/00* | (2006.01) | |
| *G09C 5/00* | (2006.01) | |
| *H04L 9/32* | (2006.01) | |

(52) U.S. Cl.
CPC ............ *G06K 19/14* (2013.01); *G06K 19/16* (2013.01); *G07D 7/12* (2013.01); *G09C 1/00* (2013.01); *G09C 5/00* (2013.01); *H04L 9/3278* (2013.01)

(56) References Cited

U.S. PATENT DOCUMENTS

| | | | | |
|---|---|---|---|---|
| 2008/0237506 A1* | 10/2008 | Ophey | ................. | H04L 9/3278 250/580 |
| 2010/0316251 A1* | 12/2010 | Cowburn | ............... | G06K 9/209 382/100 |
| 2013/0243187 A1 | 9/2013 | Horstmeyer et al. | | |
| 2015/0229482 A1* | 8/2015 | Pinkse | ................. | H04L 9/0852 380/28 |
| 2016/0004927 A1 | 1/2016 | Yonaha | | |
| 2017/0017870 A1* | 1/2017 | Kulikovska | ............ | B42D 25/23 |
| 2017/0177853 A1* | 6/2017 | Ewing | ................... | H01L 23/576 |
| 2017/0310688 A1* | 10/2017 | Lecomte | ............... | H04L 9/3278 |
| 2018/0018846 A1* | 1/2018 | Falko | ..................... | G06K 19/10 |
| 2018/0219673 A1* | 8/2018 | Young | ................... | H04L 9/0866 |
| 2019/0109719 A1* | 4/2019 | Davis | ..................... | H04L 9/3278 |

OTHER PUBLICATIONS

International Search Report and Written Opinion for International Patent Application No. PCT/GB2017/052181 dated Nov. 29, 2017, 4 pages.
J. Roberts et al., "Using Quantum Confinement to Uniquely Identify Devices," Scientific Reports, vol. 5, No. 1, Nov. 10, 2015, XP055367818, retrieved from: https://www.researchgate.net/publication/272751942, 9 pages.
Cao et al., "Optical identification using imperfections in 2D materials," IOP Science, 2017, 2D Materials, vol. 4, No. 4, 19 pages.
Jordan et al., "Identifying Counterfeit Medicines with Industry-Suitable Technologies," Pharmaceutical Engineering, The Official Magazine of ISPE, May/Jun. 2012, vol. 32, No. 3, 7 pages.
Ivanova et al., "Unclonable security features for additive manufacturing," Science Direct, Additive Manufacturing 1-4 (2014, 24-31.
Quantum Base Ltd.: "Can you guarantee that your products are genuine? Quantum Base can help you with unbreakable security at box and foil level today and pill level after clinical trials," May 19, 2016, (May 19, 2016), XP055430107, Retrieved from: http://quantumbase.com/wp-content/uploads/2016/06/PHARMA-INFOGRAPHIC-03_04.pdf, 1 page.

* cited by examiner

OPTICAL PUF AND OPTICAL READING OF A SECURITY ELEMENT

The present invention relates generally to the optical reading of a security element, and in particular to related methods and systems for determining a unique identifier for such an optically read security element.

There is often a need to prove, or disprove, the authenticity of an object or similar. For instance, this might be needed for security purposes, for example to allow or prevent access to certain functionality associated with the object, or simply to allow a user or consumer of the object to be satisfied that they are using an authentic object. It will be appreciated that such tests for authenticity find use in the fields of anti-counterfeiting, security and so on.

In order to be able to prove that an object is an authentic object, or in other words to authenticate an object, that object might be provided with a unique identifier in one form or another. "Unique" might not necessarily mean that it is impossible for another object to have the same identifier, but instead that it is statistically highly unlikely for this to be the case, or in other words for the identifier to be accidentally stumbled across by guesswork or simple trial and error.

A unique identifier might, for example, take the form of or be derived from a physical (sometimes referred to as physically) unclonable function. This might be in the form of a device or other element, the properties of which depend on small variations in construction or fabrication or similar, but which nevertheless can be used to provide a unique identifier. For instance, in a vast array of memory cells, a certain number of memory cells may be defective, and this number or arrangement of defective cells will be different for different arrays that are produced. Thus, this is a simple example of a unique identifier. Another example might be, for instance, a capacitance or resistance of an electrical component, based on the thickness of layers within that component, or the extent of those layers, and so on. Due to tolerances in manufacturing, each component will likely have a slightly different construction, and so a slightly different, and unique, electrical property.

Unique identifiers do not necessarily need to be based on electrical principles. For instance, physical unclonable functions may be probed or otherwise challenged optically in order to determine a unique identifier. For instance, the way in which one or more optical emitters are provided on an object may, as above, yield an overall emission spectrum or map which is unique, again providing a readable unique identifier.

Traditionally, the generation of unique identifiers, and/or associated use of physical unclonable functions, have been based on macroscopic effects. More recently though, it has been proposed to incorporate quantum mechanical effects in the generation of unique identifiers. In these more recent examples, for instance, an electrical component exhibiting quantum mechanical confinement (e.g. a resonant tunneling diode) may be used as a quantum mechanical based physical unclonable function. The electrical properties of such a device or structure, and thus the unique identifier, are based on quantum mechanical principles. Similarly, optical based physical unclonable functions may be based on the emissions spectra of quantum dots, or 2-D materials, or similar, located on an object. In both cases, it may be extremely difficult, if not impossible, to be able to physically copy a security element (e.g. being or comprising a physical unclonable function) based on quantum mechanical effects. This is to the extent that the unique identifier provided by such an element may not be circumvented, and certainly not in any practical time frame.

Depending on the exact implementation, it might be relatively straightforward to be able to determine (e.g. for the first time, or subsequently, in order to cross-check) a unique identifier based on electrical principles. However, the same cannot necessarily be said for optical-based security elements, for example those security elements that are optically read in order to determine a unique identifier. Whilst it may be relatively easy to optically determine a unique identifier in a laboratory environment, or a highly controlled environment, it will be very difficult, if not impossible, to be able to quickly, or easily, or cheaply do this in a more commercial environment, for example with a typical consumer-like device or a consumer-like environment. Even if it is possible to determine a unique identifier using a more commercial, end-user, device, current approaches or proposals for such use may not offer satisfactory levels of such determination, or related cross-checking for authentication, or related security functionality.

It is an example aim or example embodiments of the present invention to at least partially overcome or avoid one or more disadvantages of the prior art, whether identified herein or elsewhere, or to at least provide a viable alternative.

According to the present invention there are provided apparatus and methods as set forth in the claims that follow. Other features of the invention will be apparent from the dependent claims, and the description which follows.

According to a first aspect of the present invention, there is provided a method of determining a unique identifier for a security element, the method comprising: optically reading the security element via a configurable optical filter system, a readable optical transmission property of the filter system varying with respect to a configuration of the filter system; the reading comprising determining data indicative of an optical property of the security element at a first configuration of the filter system, and determining data indicative of an optical property of the security element at a second, different, configuration of the filter system; and the unique identifier being determined from a map of the variation in determined data indicative of an optical property with respect to the configuration of the filter system, wherein the reading is undertaken for multiple locations across the security element at the or each configuration of the filter system, such that the map is a map of the variation in determined data indicative of an optical property across the security element with respect to the configuration of the filter system, and wherein the reading for multiple locations across the security element is undertaken in a single reading step, using a reader with a two-dimensional sensor.

The optical filter system might comprise an optical filter, a readable optical transmission property of the filter varying with respect to an angle of orientation of the filter, such that the optical filter system is configurable with respect to the angle of orientation of the filter.

The optical filter system might comprise a plurality of different optical filters, each filter having a different optical transmission property, such that the optical filter system is configurable with respect to which filter is used.

The optical filter system might comprise an optical filter, a readable optical transmission property of the filter varying with respect to one or more of a temperature of that filter, an electric field across that filter, or an applied driving frequency when the optical filter is an acousto-optic tuneable filter, such that the optical filter system is configurable with respect to which temperature, electric field, or driving frequency is used.

Data indicative of an optical property of the security element might comprise one or more of: an actual optical property; and/or an electromagnetic emission spectrum of at least a part of the security element; and/or a peak, trough, or point of inflection in an electromagnetic emission spectrum of at least a part of the security element; and/or a physical location in relation to the security element of an actual optical property; and/or a physical location of a peak, trough, or point of inflection in an electromagnetic emission spectrum of the security element in relation to the security element.

The security element might comprise one or more continuous or discrete components exhibiting quantum mechanical confinement, the or each component being capable of emitting electromagnetic radiation linked to that quantum mechanical confinement, wherein the confinement of the one or more continuous or discrete components optionally confines in one or more of 3D, 2D, or 1D, or 0D.

The method may comprise causing the security element to emit electromagnetic radiation, to facilitate the optical reading of the security element, by one or more of: irradiating the security element with electromagnetic radiation; and/or irradiating the security element with electromagnetic radiation such that emission occurs by non-resonant photoluminescence; and/or irradiating the security element with electromagnetic radiation, wherein an irradiation wavelength is different from an emission wavelength of the security element; and/or electrical excitation.

One or both of the security element and/or optical filter system may comprise, or be associated with, a designated feature, for use in determining an angle of orientation of the reader with respect to the security element and/or optical filter, wherein the designated feature optionally comprises an alignment marker or a diffraction grating.

The optical filter system may comprise one or more of a band pass filter, an edge filter, a notch filter or a tuneable Bragg grating in a fibre.

The optical transmission property may be a central transmission wavelength or transmission band.

The reader may be a handheld, or wearable, mobile device.

The map, or a unique signature or identifier derived from the map, may be stored in an (e.g. secure) location, for use in authentication of the security element on a subsequent reading of that security element.

According to a second aspect of the present invention, there is provided a system for determining a unique identifier for a security element, the system comprising: a configurable optical filter system, an optical transmission property of the filter system varying with respect to a configuration of the filter system; an optical reader, for optically reading the security element via the optical filter system; the reading comprising determining data indicative of an optical property of the security element at a first configuration of the filter system, and determining data indicative of an optical property of the security element at a second, different, configuration of the filter system; and the unique identifier being determined from a map of a variation in determined data indicative of an optical property with respect to the configuration of the filter system, wherein the reader is arranged to undertake readings for multiple locations across the security element at the or each configuration of the filter system, such that the map is a map of the variation in determined data indicative of an optical property across the security element with respect to the configuration of the filter system, and wherein the reader comprises a two-dimensional sensor for reading multiple locations across the security element in a single reading step.

According to a third aspect of the present invention, there is provided a method of determining a unique identifier for a security element, the method comprising: optically reading the security element via a configurable optical filter system, a readable optical transmission property of the filter system varying with respect to a configuration of the filter system; the reading comprising determining data indicative of an optical property of the security element at a first configuration of the filter system, and determining data indicative of an optical property of the security element at a second, different, configuration of the filter system; and the unique identifier being determined from a map of the variation in determined data indicative of an optical property with respect to the configuration of the filter system. That is, the reading across multiple locations, and/or the single reading with a 2D sensor, as discussed in the first aspect, might not always be required (although highly likely to be the case in a practical implementation).

According to a fourth aspect of the present invention, there is provided a system for determining a unique identifier for a security element, the system comprising: a configurable optical filter system, an optical transmission property of the filter system varying with respect to a configuration of the filter system; an optical reader, for optically reading the security element via the optical filter system; the reading comprising determining data indicative of an optical property of the security element at a first configuration of the filter system, and determining data indicative of an optical property of the security element at a second, different, configuration of the filter system; and the unique identifier being determined from a map of a variation in determined data indicative of an optical property with respect to the configuration of the filter system. That is, the reading across multiple locations, and/or the single reading with a 2D sensor, as discussed in the second aspect, might not always be required (although highly likely to be the case in a practical implementation).

According to a fifth aspect of the present invention, there is provided a method of authenticating, comprising: optically reading a security element via a configurable optical filter system, a readable optical transmission property of the filter system varying with respect to a configuration of the filter system; the reading comprising determining data indicative of an optical property of the security element at a configuration of the filter system; and the authenticating further comprising comparing the determined data indicative of an optical property with the unique identifier determined using the method of the first or third aspects, or the system of the second or fourth aspects.

According to a sixth aspect of the present invention, there is provided a system for authenticating, the system comprising: a configurable optical filter system, a readable optical transmission property of the filter system varying with respect to a configuration of the filter system; an optical reader, for optically reading a security element via the optical filter system; the reading comprising determining data indicative of an optical property of the security element at a configuration of the filter system; and the system being arranged to compare the determined data indicative of an optical property with the unique identifier determined using the method of the first or third aspects, or the system of the second or fourth aspects.

According to a seventh aspect of the present invention, there is provided a security element suitable for use in any of the preceding claims, wherein the security element comprises: a first part, capable of emitting electromagnetic radiation; a second part, comprising a configurable optical filter system, a readable optical transmission property of the filter system varying with respect to a configuration of the filter system, the first part being readable via the second part.

According to an eighth aspect of the present invention, there is provided a method of determining a unique identifier for a security element, the method comprising: optically reading the security element via a configurable optical filter system, a readable optical transmission property of the filter system varying with respect to a configuration of the filter system; the reading comprising determining data indicative of an optical property of the security element at a first configuration of the filter system; and the unique identifier being determined from a map of the determined data indicative of an optical property with respect to the configuration of the filter system, wherein the reading is undertaken for multiple locations across the security element at the first configuration of the filter system, such that the map is a map of the determined data indicative of an optical property across the security element with respect to the configuration of the filter system, and wherein the reading for multiple locations across the security element is undertaken in a single reading step, using a reader with a two-dimensional sensor.

According to a ninth aspect of the present invention, there is provided a system for determining a unique identifier for a security element, the system comprising: a configurable optical filter system, an optical transmission property of the filter system varying with respect to a configuration of the filter system; an optical reader, for optically reading the security element via the optical filter system; the reading comprising determining data indicative of an optical property of the security element at a first configuration of the filter system; and the unique identifier being determined from a map of the determined data indicative of an optical property with respect to the configuration of the filter system, wherein the reader is arranged to undertake readings for multiple locations across the security element at the first configuration of the filter system, such that the map is a map of the determined data indicative of an optical property across the security element with respect to the configuration of the filter system; and wherein the reader comprises a two-dimensional sensor for reading multiple locations across the security element in a single reading step.

According to a tenth aspect of the present invention, there is provided a method of authenticating, comprising: optically reading a security element via a configurable optical filter system, a readable optical transmission property of the filter system varying with respect to a configuration of the filter system; the reading comprising determining data indicative of an optical property of the security element at a configuration of the filter system; and the authenticating further comprising comparing the determined data indicative of an optical property with the unique identifier determined using the method of the eighth aspect, or using the system of the ninth aspect.

According to an eleventh aspect of the present invention, there is provided a system for authenticating, the system comprising: a configurable optical filter system, a readable optical transmission property of the filter system varying with respect to a configuration of the filter system; an optical reader, for optically reading a security element via the optical filter system; the reading comprising determining data indicative of an optical property of the security element at a configuration of the filter system; and the system being arranged to compare the determined data indicative of an optical property with the unique identifier determined using the method of the eighth aspect, or using the system of the ninth aspect.

It will be appreciated that any one or more features described in relation to any one particular aspect of the present invention may be used in place of, or in combination with, any one or more features of another aspect of the present invention, unless such combination or replacement would be understood by the skilled person to be mutually exclusive, based on a reading of this disclosure. In particular, it will be understood that any features described in relation to a method aspect of the present invention can be used in combination with any apparatus aspect of the present invention, and that any features described in relation to an apparatus aspect of the present invention can be used with any method aspect of the present invention.

Figure 2:
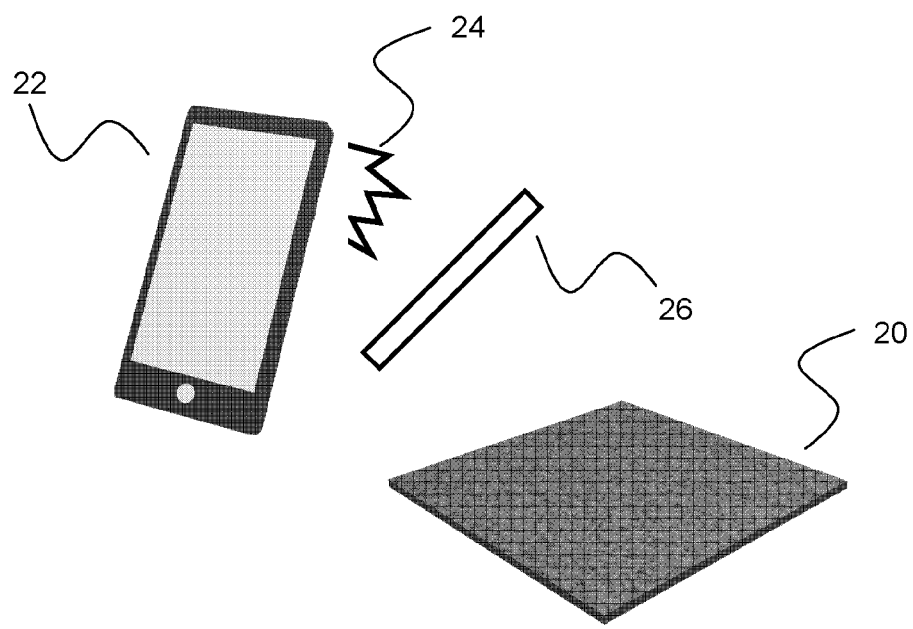
Figure 3:
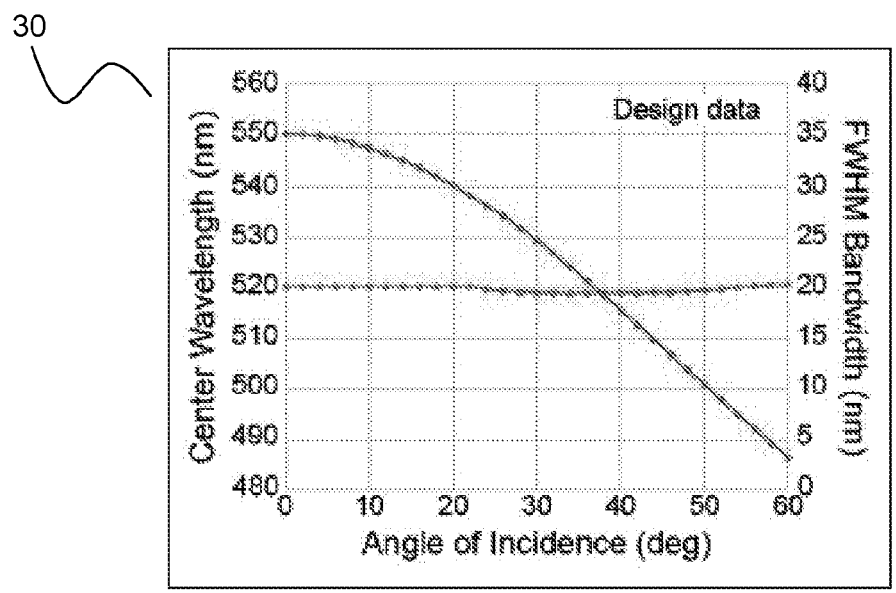
Figure 4:
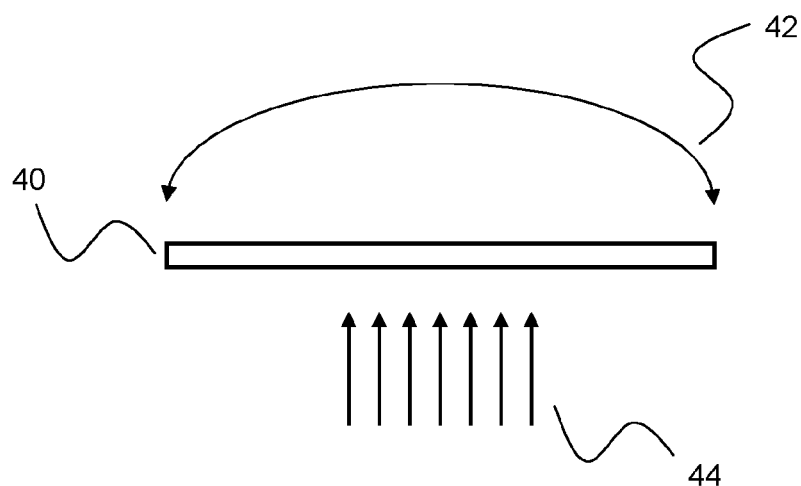
Figure 5:
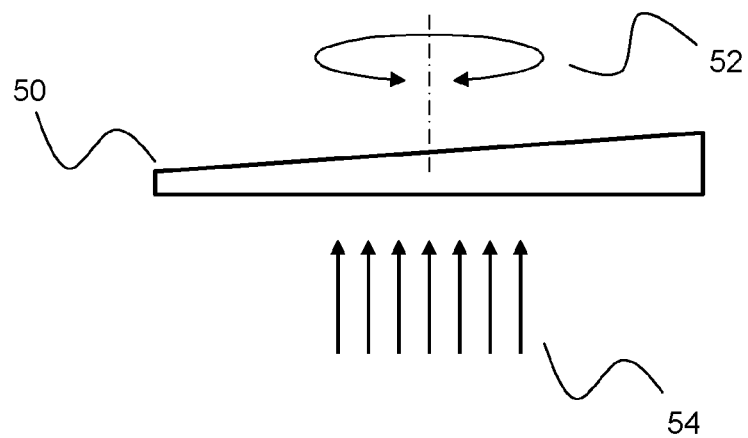
Figure 6:
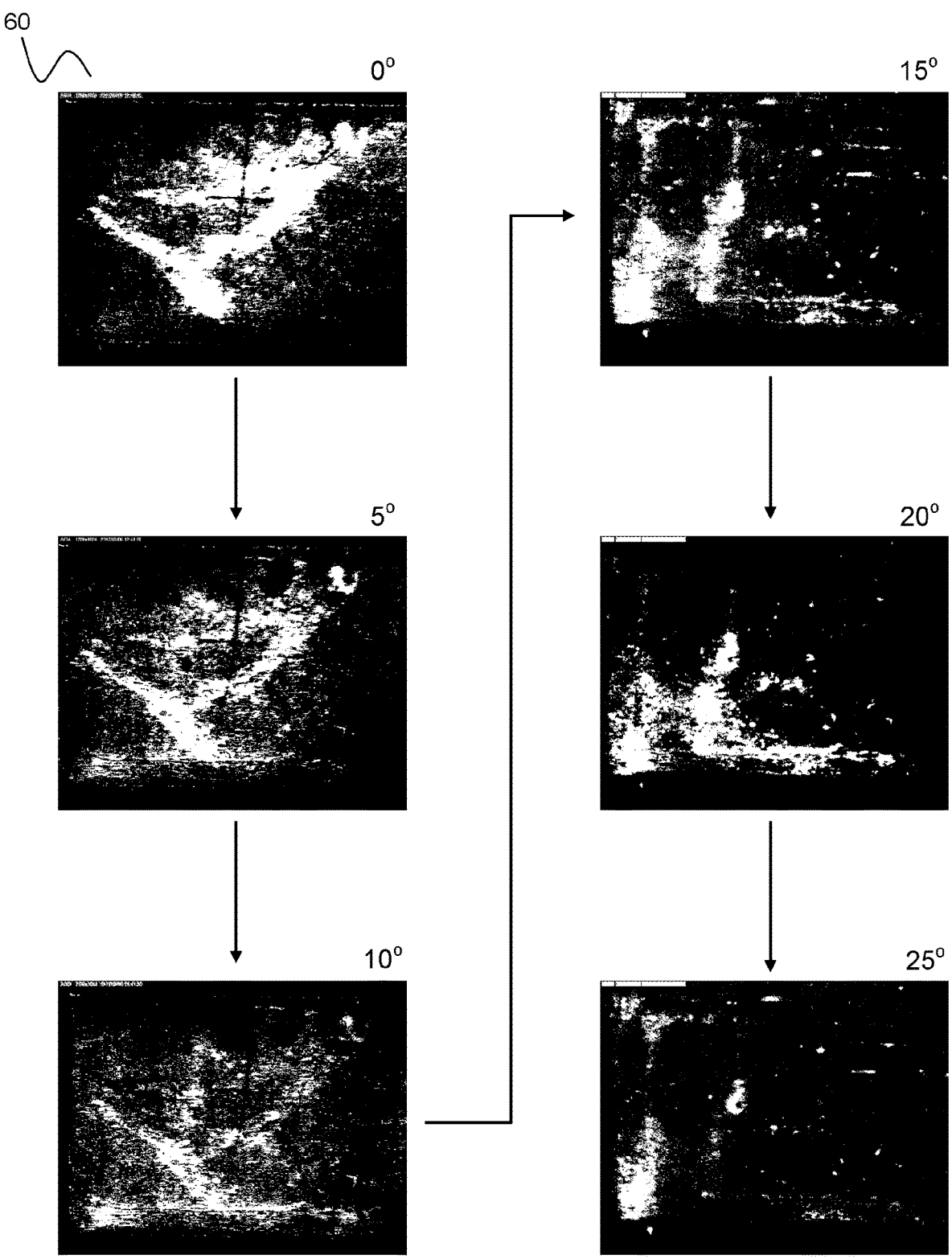
Figure 7:
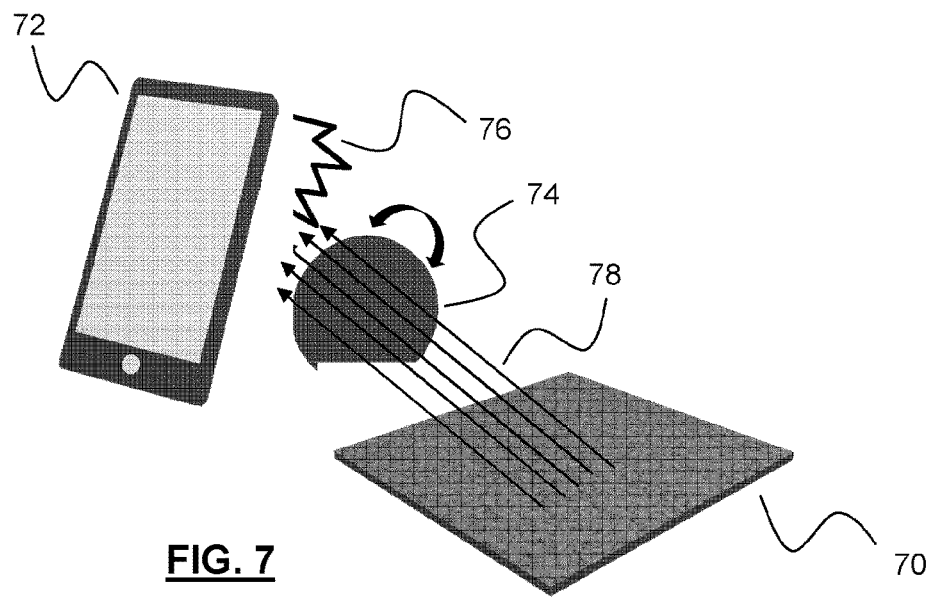
Figure 8:
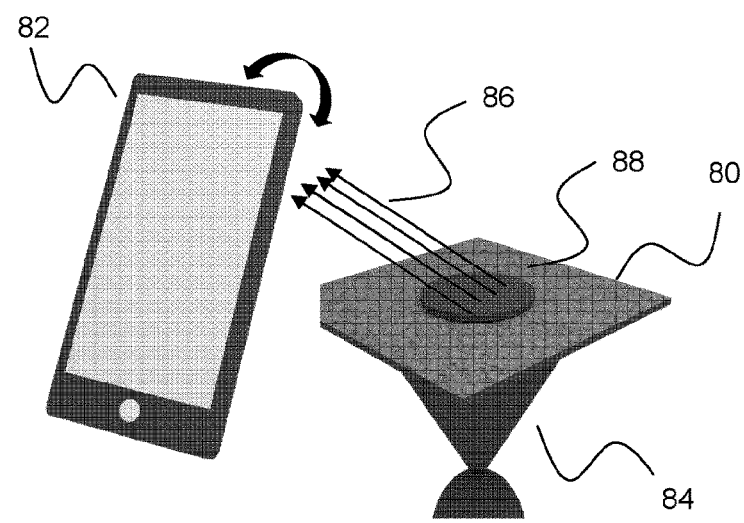
Figure 9:
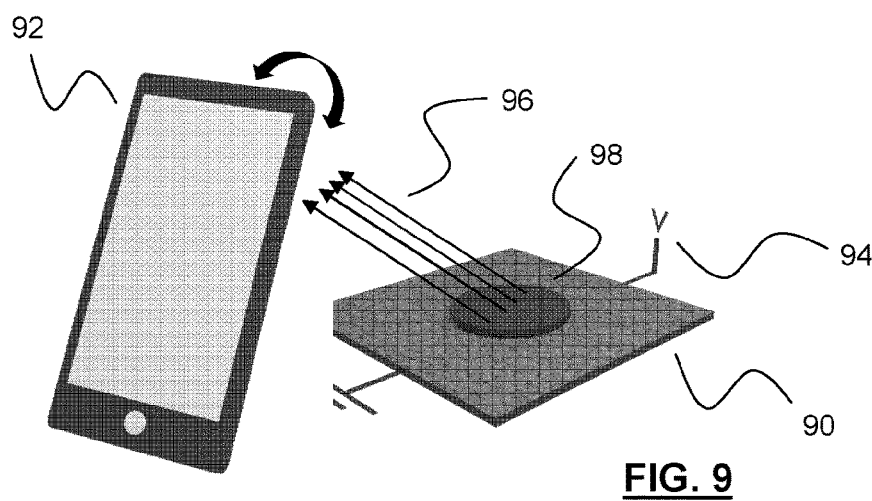
Figure 10:
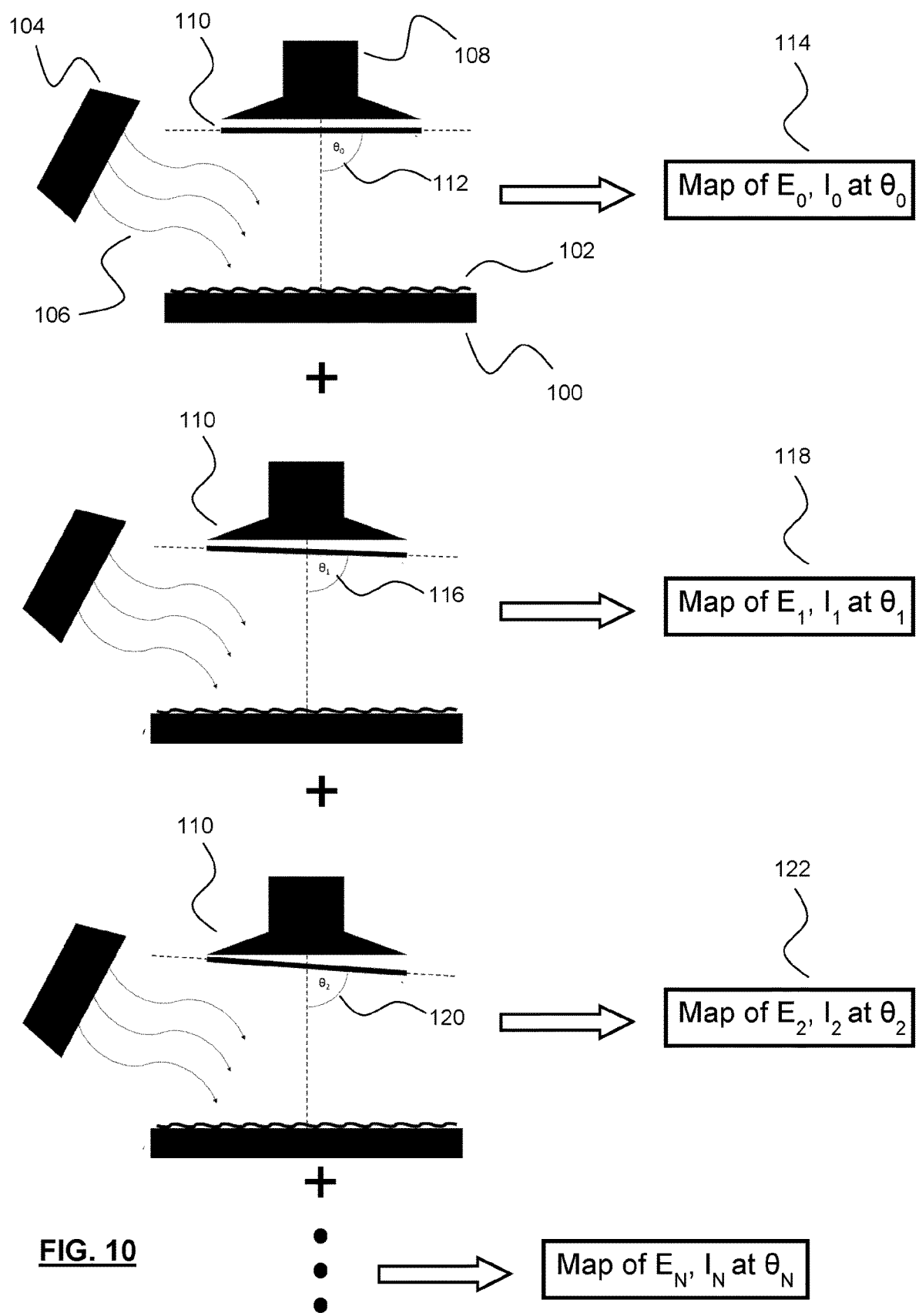
Figure 11:
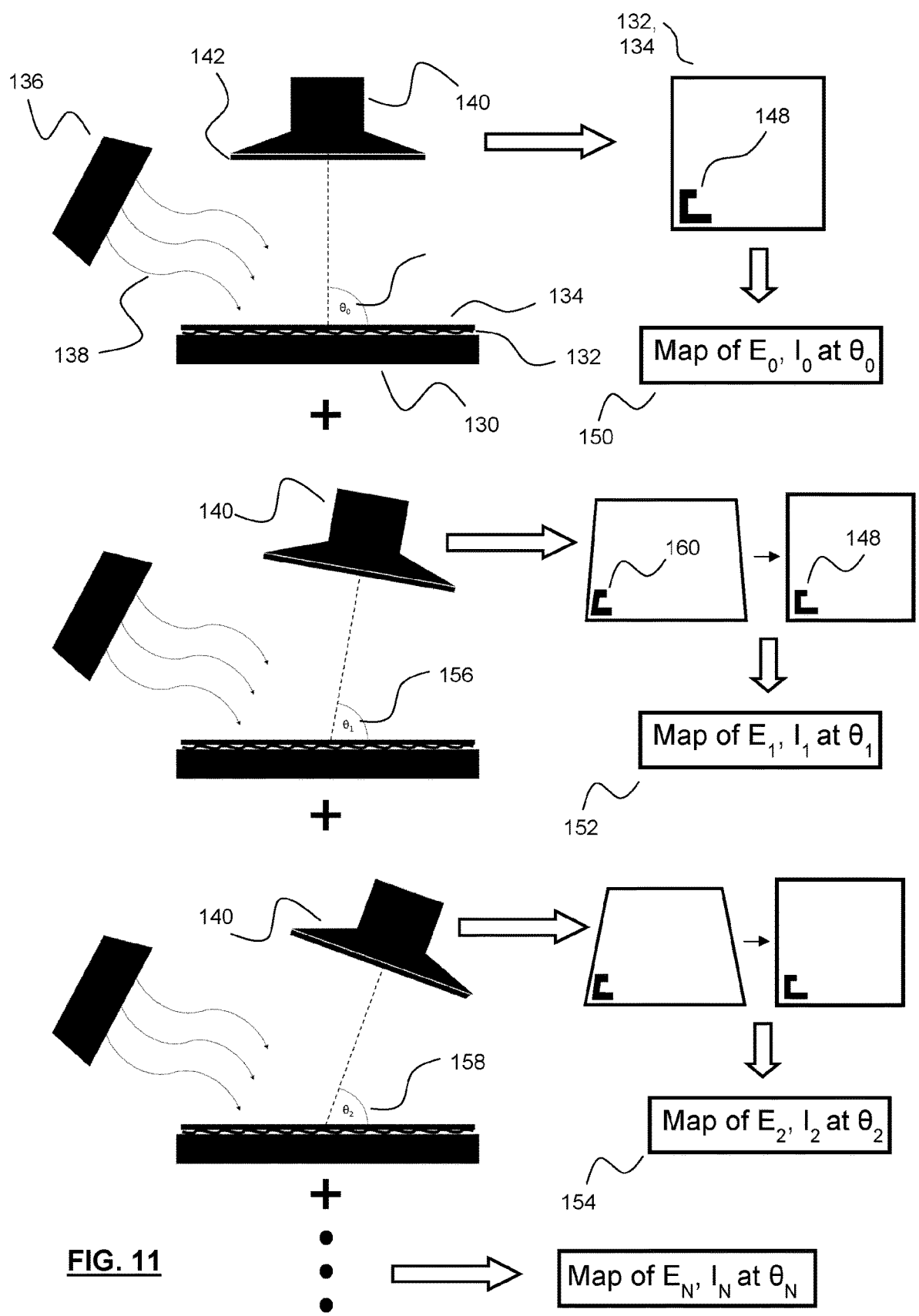
Figure 12:
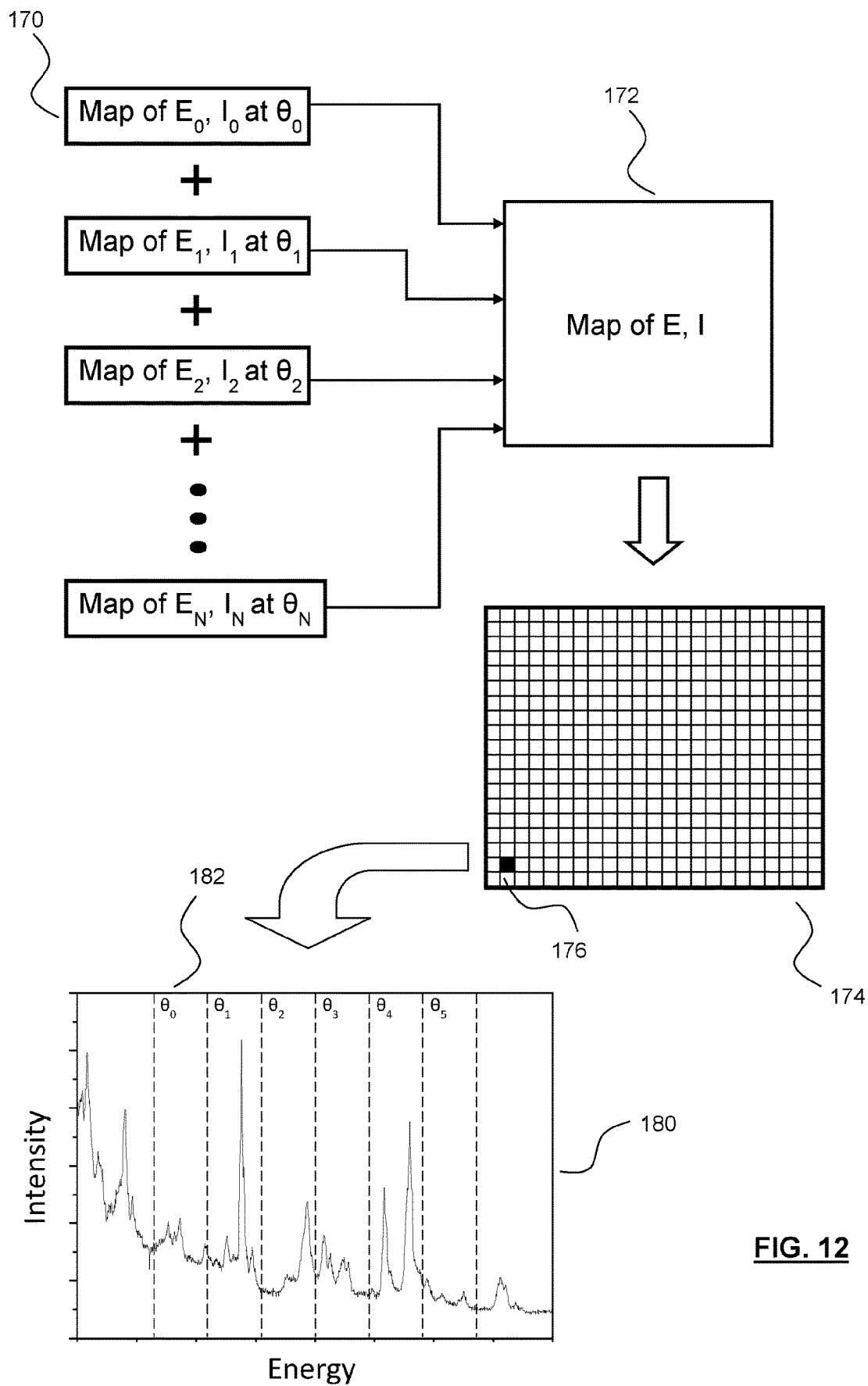
Figure 13:
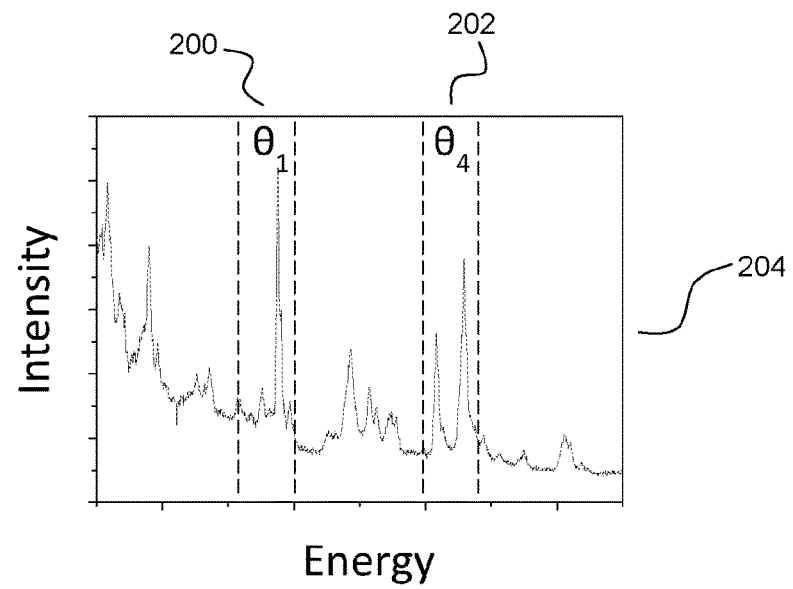
Figure 13:
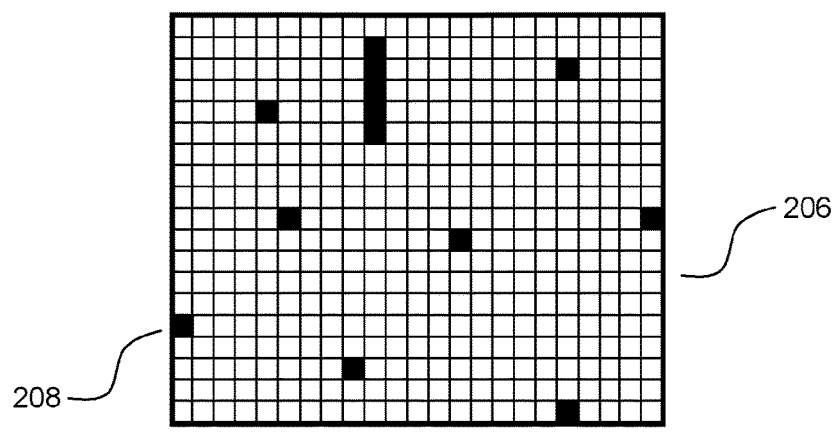
Figure 13:
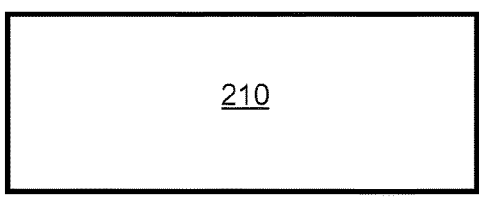
Figure 14:
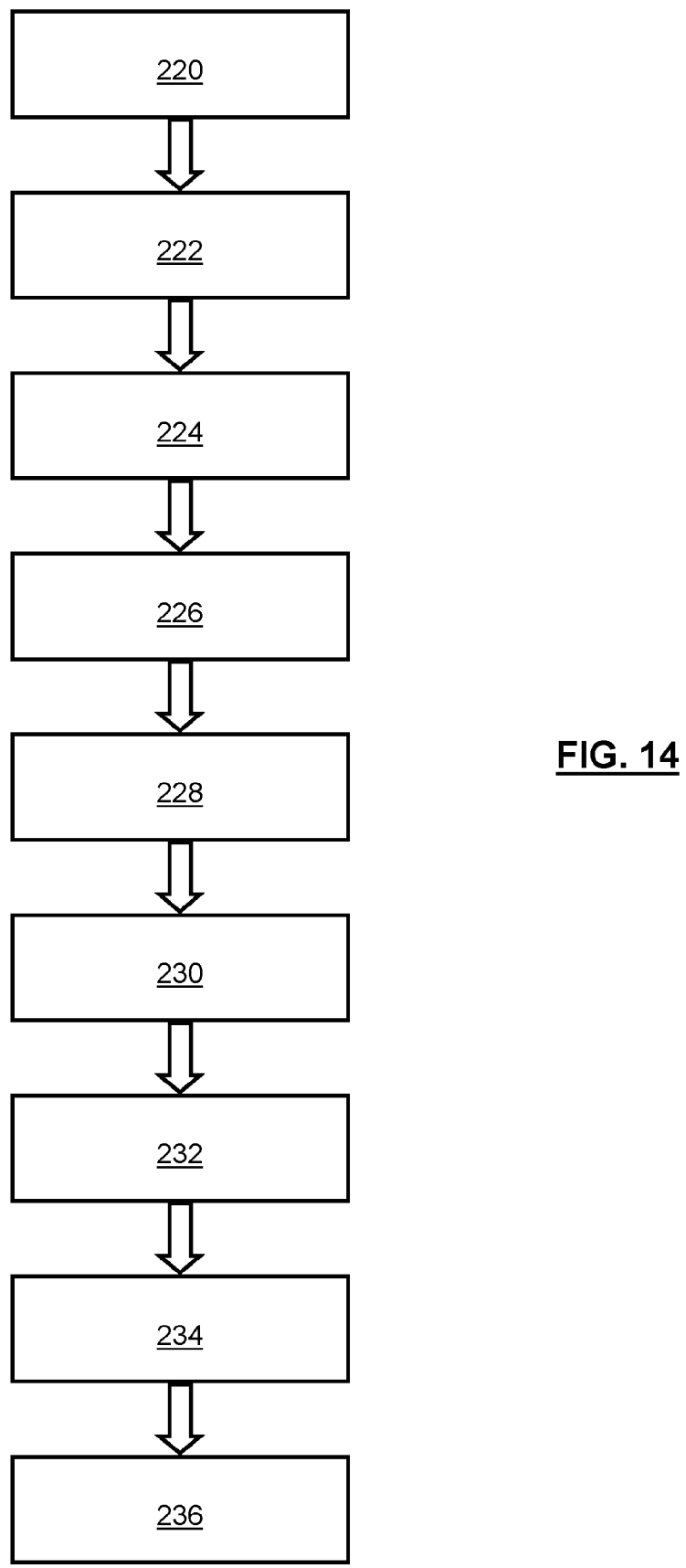
Figure 15:
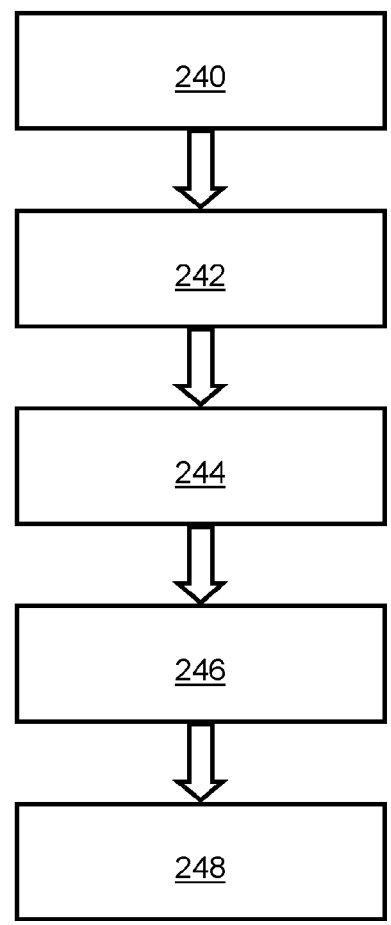
Figure 16:
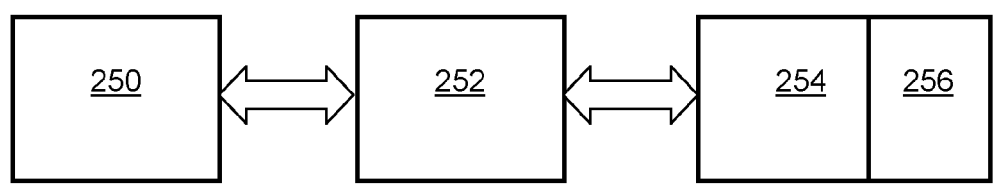
Figure 17:
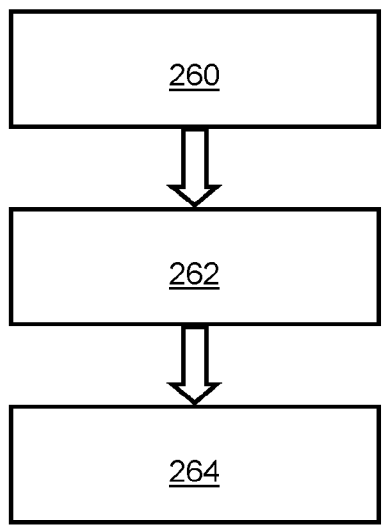
Figure 18:
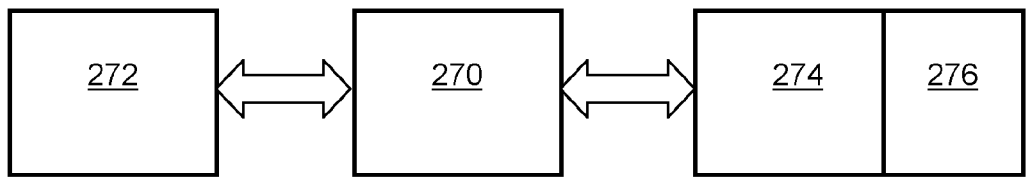
Figure 19:
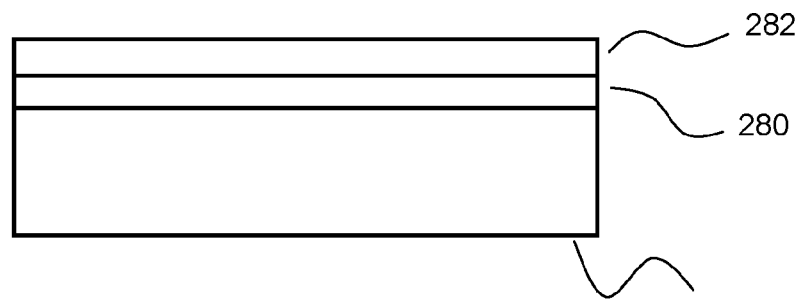

For a better understanding of the invention, and to show how embodiments of the same may be carried into effect, reference will now be made, by way of example, to the accompanying diagrammatic Figures in which:

FIG. 1 schematically depicts the optical reading of a security element according to a proposed system and method;

FIG. 2 schematically depicts optical reading of a security element via an optical filter system according to an example embodiment;

FIG. 3 is a plot schematically depicting a variation in an optical transmission property of the optical filter system of FIG. 2, in different configurations of that optical filter system, according to an example embodiment;

FIGS. 4 and 5 schematically depict different configurations of an optical filter in terms of their angle of orientation relative to a security element and/or a reader;

FIG. 6 schematically depicts a series of optical readings of a security element taken via an optical filter system at different configurations;

FIGS. 7 to 9 schematically depict different ways of causing a security element to emit electromagnetic radiation according to example embodiments;

FIG. 10 schematically depicts a system and method for determining a unique identifier for a security element according to an example embodiment;

FIG. 11 schematically depicts a system and method for determining a unique identifier for a security element according to a different example embodiment;

FIG. 12 schematically depicts the creation of a map of a variation in determined data indicative of an electrical property of a security element with respect to configurations of the optical filter system;

FIG. 13 schematically depicts principles associated with authenticating of a security element according to example embodiments;

FIG. 14 is a flow chart depicting the determination of a unique identifier of a security element, and a subsequent authentication of the security element using that unique identifier;

FIG. 15 schematically depicts general methodology associated with example embodiments;

FIG. 16 schematically depicts general principles associated with a system according to example embodiments;

FIG. 17 schematically depicts different methodology associated with example embodiments;

FIG. 18 schematically depicts general principles associated with a system according to example embodiments; and FIG. 19 schematically depicts a security element according to an example embodiment.

FIG. 1 schematically depicts a proposed system and method for optically reading a security element. The Figure shows the security element 10. A reader for reading the security element 10 is shown in the form of a mobile device, in this case a mobile telephone 12. It has been proposed that the security element 10 may be optically read via the mobile telephone 12 by appropriate irradiation of the security element 10, for example by way of a flash 14 provided by the mobile telephone 12, and an appropriate detection of emitted electromagnetic radiation from the security element 10. In more detail, the security element 10 can be read by an appropriate sensor and related components of the mobile telephone 12.

As with all examples described herein, the security element 10 may comprise one or more components arranged to emit electromagnetic radiation when appropriately stimulated. The components may be, for example, quantum dots, quantum wires, flakes or layers of 2D material. The or each component may emit radiation at a single wavelength, or the or each component may emit radiation with different wavelengths, for example corresponding to a variation in band gap of the or each particular component.

The reading of the security element 10 may comprise establishing a two-dimensional (2D) map of how the security element 10 emits radiation across the security element (e.g. across the length and width of the security element). Typically, the one or more components that emit radiation will not be provided within the security element 10 in a controlled, repeatable and consistent manner across different security elements, but will instead be deposited in a random or deliberately uncontrolled manner. It is this deliberate lack of control which will allow the security element 10 to effectively function as a physically unclonable function, and/or to therefore provide a unique identifier (physically unclonable functions are normally employed in specific ways, and unique identification is perhaps a more general feature, function, or description). That is, the emitters will be distributed across the element in a unique manner.

A read map may be compared in some way with a stored map, to authenticate the security element 10.

The system and methodology shown in FIG. 1 may function satisfactorily. Indeed, it can be very difficult to easily replicate the precise layout of the one or more components that emit electromagnetic radiation, to the extent that it is very difficult to copy the unique identifier provided by the security element. However, it is not impossible, and with advances in technology it may be easier to overcome or circumvent the security that the unique identifier provides, since it may be easier to replicate that unique identifier. Also, the proposed methodology and system in FIG. 1 takes a single reading or snapshot of the emission spectra or spectrum across the security element 10. Since only a single image or snapshot is used to determine the unique identifier, and likely with a commercial end-user device, only a single unique identifier needs to be in some way copied, or replicated or circumvented in order to overcome the security that is provided. This is not just important in the actual reading phase, but also when information for authentication is transmitted to or from a reader, for example in order to authenticate the security element via a database having a previously determined identifier stored therein, for use in the authentication.

It has been realised by the inventors of the present invention that one or more problems associated with the sort of methodology and system as shown in FIG. 1 can be overcome in a relatively simple manner, but which at the same time provides a vastly improved system and method for determining (e.g. initially, or subsequently for authentication) a unique identifier, and a related system and method for authentication using that unique identifier.

In particular, according to the present invention there is provided a method of determining a unique identifier for a security element. The method comprises optically reading the security element by a configurable optical filter system, a readable optical transmission property of the filter system varying with respect to the configuration of the filter system (e.g. the configuration being an inherent configuration of the filter system itself, or of the filter relative to the security element or a reader of the element). The reading comprises determining data indicative of an optical property of the security element at a first configuration of the filter system, and determining data indicative of an optical property of the security element in a second, different configuration of the filter system. The unique identifier is determined from a map (which includes the identifier being the map) of the variation in determined data indicative of an optical property of the security element, with respect to the configuration of the filter system. In most practical implementations, it is most likely that the reading is undertaken for multiple locations across the security element at the or each configuration of the filter system, such that the map is a map of a variation in determined data indicative of an optical property across the security element with respect to the configuration of the filter system. In most practical implementations, it is most likely that the reading for multiple locations across the security element is undertaken in a single reading step, using a reader with a 2D sensor.

The main, overall and general concept of the present invention is perhaps best shown in FIG. 2. FIG. 2 shows a security element 20, and a mobile device 22 for use in reading that security element 20, for example via the use of a flash 24 of the mobile device 22 for use in irradiating the security element 20. In these respects, the methodology and system generally depicted in FIG. 2 is almost identical to that shown in and described in reference to FIG. 1. The important difference with FIG. 2, and thus the important feature defining the present invention, is the presence of a configurable optical filter system 26, via which the security element 20 is to be read by the mobile device 22.

The configurable optical filter system 26 allows the optical reading of the security element 20 to be undertaken at a plurality of configurations of the configurable optical filter system 26. The optical transmission property of the filter system 26, either inherently or relative to the mobile device 22 or element 20, are different for each configuration. That is, different optical properties of the element are readable at each configuration. This means that a far richer and more complex, and therefore harder to copy, map of emission wavelengths or energies (or other optical property) from the security element 20 can be very easily obtained, and used in the determination of a unique identifier for the security element 20.

The optical filter system 26 may be configurable in any one of a number of ways in order to ensure that a readable optical transmission property of the filter system varies with respect to the particular configuration. For example, the filter system 26 can be configured to have different transmission properties with respect to the polarisation of emitted radiation. In another example, the filter system 26 may be configurable to vary the intensity of transmitted electromagnetic radiation. However, it is considered that the most effective filter system for the purposed of example embodiments will be one which is configurable with respect to the variation in transmitted electromagnetic wavelengths or energies. This will allow the filter system to be used to selectively discriminate between emitters of different wavelengths forming part of a security element, such that different configurations of the filter system can be used to detect the presence or absence of certain emission wavelengths or energies from one or more components of the security element.

The filtering by wavelength is particularly useful when the security element comprises one or more continuous or discrete components exhibiting quantum mechanical confinement, the or each component being capable of emitting electromagnetic radiation linked to the quantum mechanical confinement. Preferably, the confinement of the one or more continuous or discrete components confines in one or more of 3D, 2D, 1D or 0D. The security element will preferably have a mixture of such components and related confinements. In other words, the one or more components forming the security element preferably emits radiation at more than one different wavelength or energy, and/or has or have different emission spectra. For example, components exhibiting 3D quantum mechanical confinement might give a generally flat background emission spectra. 2D confinement might give a broad, sloping background, or perhaps a broad peak. 1D confinement would exhibit narrower peaks in emission energy. 0D confinement would exhibit very sharp peaks in emission spectra. Combinations of one or more degrees of confinement would lead to particularly complex emissions spectra, lending itself to filtration by wavelength, and unique identifiers being based on such filtration. That is, at one configuration an emitter, or its emission, might not be readable, while it can be read at another angle. Different portions of the different emission spectra can be taken advantage of at different configurations. For example, when read with the system used in FIG. 1, a single snapshot or reading might not be able to pick up the subtleties in the different natures of emission spectra, and in particular, when these emission spectra are linked to the particular characteristic spectra associated with particular degrees of quantum mechanical confinement. However, and in contrast, the present invention takes advantage of this different spectra in a powerful manner, since changing the configuration of the optical filter system, and undertaking optical readings of the security element at these different configurations, will allow these different emission energies and spectra to be detected or otherwise discriminated, providing a much richer map of emission energies with respect to the different configurations of the optical filter system. This will allow a unique identifier to be determined which is far harder to replicate of circumvent.

The optical filter system may be changed from one configuration to another, different, configuration in any appropriate manner. This might, of course, depend on the actual inherent nature or mechanics of the optical filter system, or the nature of emission that is being filtered for.

In a basic example, the optical filter system might simply comprise of a plurality of different optical filters, each filter having a different optical transmission property, such that the optical filter system is configurable with respect to which filter of the plurality is used. The different filters could have different polarisations, or transmission bands. This might be a relatively cheap and simple way of implementing a filter system, since there is no absolute requirement for complex control of the filter system, for example using associated electronics or control circuitry. A potential drawback is that a number of optical filters are required, which while relatively easy to achieve in a laboratory, manufacturing or test environment, might be far harder to achieve for an end-user, or consumer, or similar.

Other implementations are, of course, possible. For instance, the optical filter system might comprise an optical filter, an optical transmission property (e.g. transmission band) of the filter system varying with respect to one or more of a temperature of that filter, an electric field across that filter, or an applied driving frequency when the optical filter is an acousto-optic tuneable filter, such that the optical filter is configurable with respect to which temperature, electric field, or driving frequency is used. For instance, the temperature of, or electric field across, a filter might affect its dimensions or optical properties (e.g. a configuration of multilayers, or the birefringence), such that different configurations can be achieved. These sorts of optical systems might be more readily tuneable than the use of multiple filters described previously. However, at the same time, such a tuneable filter or associated driving circuitry or similar might add to cost or complexity in comparison with the use of a number of relatively simple, different, optical filters.

A perhaps ideal implementation would be a system which has the tuneability described above, but also the simplicity described above. A good example of such a system is one which comprises an optical filter, an optical transmission property of the filter varying with respect to an angle of orientation of the filter, such that the optical filter system is configurable with respect to the angle of orientation of the filter. This approach is very simple, in that only a single optical filter is required either at the manufacturing or test stage, or at the end-user or consumer stage. Also, complex control or driver electronics are not required. There simply needs to be a way of implementing different orientations of the filter relative to the reader or security element to achieve the different configurations. This could amount to a user tilting the filter or reader, or rotating the filter or reader. So, tuneability and simplicity are achieved. The filter need only have transmission properties that vary with respect to the relative orientation, for example by way of a multilayer structure (for tilting) or a property (e.g. thickness or configuration of layers) that varies across the filter (for rotation).

On the basis of the above, a perhaps ideal implementation of optical filter system configurable by way of the relative orientation of the filter of that system will now be described in more detail. However, it will be appreciated that general principles will apply to any configurable optical filter system.

FIG. 3 schematically depicts a plot 30, showing transmission properties of an optical filter, in this case a band pass filter. A centre transmission wavelength of the filter is shown as the angle of incidence of the filter with respect to the emission source (or, indeed, angle of reading by a reader) is varied. Similarly, the full width at half maximum (FWHM) bandwidth of the filter is also shown as the angle is varied.

It can be seen from FIG. 3 that the FWHM bandwidth remains substantially constant, irrespective of the angle of orientation. However, and most importantly, it can be seen that the centre transmission wavelength varies quite considerably as the angle of orientation is varied. So, in this example, it can be seen that when the emission wavelengths are incident or read perpendicularly with respect to the filter (zero degrees as shown in the plot) the centre wavelength is 550 nm. As the angle is varied, it can be seen that the centre wavelength decreases to around 485 nm when the angle is 60 degrees, and that there is continual variation in the centre wavelength between these two extremes shown in the plot 30. It is this variation in the centre wavelength of the filter which allows for the selection and discrimination of different emission wavelengths and energies as alluded to above, which can lead to a relatively simple way of vastly increasing the complexity of the map derived from the security element, and the associated security provided by the unique identifier derived from that map. This is because a map can be created that does not just comprise emission energies and intensities across the security element, but instead emission energies and intensities (or similar, e.g. related data of peak or troughs) across the security element with variation based on orientation.

Again, and to reiterate the point, while FIG. 3 shows a situation of varying the angle of incidence or reading of emitted radiation with respect to a band pass filter, the same general principle shown in FIG. 3 would apply to the other optical filter system implementations described above, for example the use of different filters with different transmission properties, or the heating of a filter, or the changing of an electric field across that filter, or the changing of the driving frequency of an acousto-optic filter. Again, the advantage is that a map can be created that does not just comprise emission energies and intensities across the security element, but instead emission energies and intensities (or similar, e.g. related data of peak or troughs) across the security element with variation based on configuration of the filter.

FIGS. 4 and 5 schematically depict how the angle of orientation of a filter can be changed with respect to emitted electromagnetic radiation. The same principles apply to changing angles at which the radiation is read by a reader.

FIG. 4 shows that a band pass filter 40 may be tilted 42 with respect to a general direction of incoming emitted electronic radiation 44. Optical path lengths within the filter 40 will be altered as a result, changing the optical transmission properties of the filter 42.

FIG. 5 shows how a band pass filter 50 with a wedge shape (or, more generally, a transmission property that varies across the filter 50) may be orientated, or re-orientated, by rotating 52 the filter 50 about a longitudinal axis along which emitted electromagnetic radiation 54 generally propagates. Optical path lengths, or paths in general, within the filter 50 will be altered as a result, changing the optical transmission properties of the filter 50.

In one example, an interference filter has alternating layers of different refractive index. In a normal filter these layers would be of fixed width/thickness with respect to distance along or across the filter, and in a wedge-shaped filter such as in FIG. 5 one or more individual layer thicknesses could also be wedges. That is, there might not be more layers as a function of position—the layers could have a different thickness with respect to position.

As might already be appreciated in the plot in FIG. 3, the discrimination between different emission energies, or in other words the reading of the security element at different configurations, can reveal quite startlingly different outputs, and ones which are readily detectable by a consumer level mobile device, such as a hand held device or wearable device (e.g. generally portable device) comprising a 2D optical sensor. A typical device might be a mobile telephone, or tablet. FIG. 6 demonstrates just how varied the readings can be.

FIG. 6 schematically depicts a series of optical readings 60 taken of a security element. This series progressively shows the variation in orientation of a band pass filter via which the security element is read with respect to radiation emitted by the security element. The series shows six images, taken in five degree increments away from normal (perpendicular) incidence of the emitted radiation onto and through the filter. In accordance with the plot shown in FIG. 3, mapped on to the actual readings shown in FIG. 6, it will be appreciated that each image shown in the series 60 reads or otherwise discriminates or filters for emitters or emissions at different wavelengths, ranging from approximately 550 nm at normal incidence (0 degrees) up to around 535 nm at 25 degrees (away from the normal).

Using the system of FIG. 1, where no deliberate/external filter is used (and certainly no re-configuration of any optical system is used) only one of the readings shown in FIG. 6 would ever be undertaken, and likely not with a optical band pass or notch or other filter, but simply reading across all visible wavelengths at any one time. Again, while the resulting reading, and underlying distribution of emitters might be quite difficult to copy, it is not impossible. In contrast, the series 60 in FIG. 6 shows that the readings and associated mapping of emission energies may be vastly more improved, and security provided more complex to overcome, by use of the configurable optical filter system as described above. Quite simply, the use of the optical filter system allows for the discrimination of different emission spectra or different types of emitters, whereas the proposed proposal of FIG. 1 does not. Again, the advantage is that a map can be created that does not just comprise emission energies and intensities across the security element from a single reading, but instead emission energies and intensities (or similar, e.g. related data of peak or troughs) across the security element with variation based on configuration of the filter.

More detailed implementations of the present invention are now discussed and described, and some more general principles associated with systems and methods are also provided. Some of those principles may be interchanged and/or replaced with one another, as will be understood by the skilled person.

FIG. 7 shows a security element 70 and a mobile device 72 for use in optically reading that security element 70. The security element 70 is read via an optical filter system 74. In this implementation, methodology might comprise causing the security element 70 to emit electromagnetic radiation via a light source, optionally a broadband light source 76 provided by the mobile device 72, for example a flash or other light source of the mobile device 72. In response to being irradiated with the light 76 from the mobile device 72, the security element 70 may emit radiation 78 back towards the mobile device 72, to be read via the optical filter system 74. In order to reconfigure the reading via the optical filter system 74, the optical filter system 74 may be orientated or re-orientated as described above, and/or the device 72 can be orientated or re-orientated as described above.

FIG. 8 shows another security element 80 and another mobile device 82. In this example, the security element 80 can be caused to emit electromagnetic radiation via irradiation by a secondary light source 84, not forming part of the mobile device 82. The source 84 might form part of the element 84, or object to which the element 80 is attached, or be external to the element 80. Again, the mobile device 82 may read radiation that is emitted 86 by the security element 80 via an optical filter system 88. In this example, the optical filter system 88 may not be freely located in-between the mobile device 82 and the security element 80, but may cover or even form part of the security element 80. The optical filter system 88 may then be reconfigured by appropriate reorientation of the security element 80 on which the filter 88 is located, or of which the security filter 88 forms a part, or via orientation or reorientation of the mobile device 82.

This latter option is still to be understood as a configuration or reconfiguration of the filter system 88 relative to the reader 82, since the filter is being optically read or inspected at a different angle via the orientation or reorientation, as described above.

FIG. 9 shows another security element 90 to be optically read by another mobile device 92. In this example, the security element 90 can be caused to emit electromagnetic radiation via electrical excitation 94. Emitted radiation 96 may be read via the mobile device 92 after the radiation 96 has passed through an optical filter system 98. Much as with the system and methodology shown in FIG. 8, the optical filter system can be reconfigured by simply re-orientating the mobile device 92 or the security element 90 such that the filter 98 is orientated at different angles with respect to the reader 92 to achieve different readable configurations.

Generally speaking, a security element can be caused to emit electromagnetic radiation in whichever way is suitable, for example, depending on how the security element emits radiation, or the physical mechanism by which one or more components of the security elements may be caused to emit radiation, or depending on the implementation of the element in conjunction with an object to be authenticated (e.g. the availability of an external light source or electrical power supply). Generally speaking, causing the security element to emit radiation might generally involve irradiating the security element with electromagnetic radiation, or via some form of electrical excitation of the security element or components thereof. Irradiating the security element with electromagnetic radiation may be undertaken in such a way that emission occurs by non-resonant photoluminescence, such that it is easier to distinguish the emitted radiation from the radiation used to excite or stimulate the security element. More generally speaking, the irradiation of the security element may be such that an irradiation wavelength is different from an emission wavelength of the security element, again, in order to make it easier to distinguish excitation radiation from emission radiation.

FIG. 10 schematically depicts a more detailed exemplary embodiment of the invention for determining a unique identifier for a security element. FIG. 10 shows that the system comprises a substrate or other object 100 onto which the security element described above has been provided. An electromagnetic radiation source 104 is used to irradiate 106 the security element 102. An optical reader 108 is used to optically read or inspect the emission from the security element 102 via an optical filter system 110. An initial reading might be undertaken when the optical reading or inspection is undertaken normally (perpendicularly) 112 with respect to both the filter system 110 and security element 102. From this reading across multiple locations of the security element 102 (e.g. taken in a single step with a 2D sensor or similar) a map 114 (e.g. a spectrum or similar) of emission energy (wavelength) versus intensity at this first angle 112 is established.

Then, the process is repeated when the filter system 110 is orientated at a second angle 116, in order to establish a second map 118 at this second angle 116. The method may continue at a third angle 120 to establish a third map 122 at that third angle 120, and so on. As discussed below, the maps at each angle may be combined into an overall map of how the emission energies vary across the element 102, and with variation in orientation of the filter system 110.

In a laboratory, manufacturing or testing environment, the angle of orientation of the filter 110 with respect to the reader 108 and/or with respect to the security element 102 can be controlled in a number of different ways. It might be quite straightforward to fix the orientation of the reader 108 and the security element 102, and to vary the angle of the filter 110 by using a step or servo motor, or some other easily controllable holder or driver. As discussed in more detail below, one or more designated features may be used to determine, at least partially optically, the relative orientation between the elements of the system, in order to establish which angle or angles are involved in the reading phase of the method, and/or to correct for that angle when establishing a map.

In a laboratory, manufacturing, or testing environment, there may be a greater degree of control of the components of the system, and/or the associated quality of those components in terms of sensitivities, resolutions, and so on. These may be used to establish a master or high quality map for use in establishing one or more unique identifiers for the security element, for future reference when that same security element is to be used in some form of identification process. The identifier might be the map, or a part thereof, for example the location of one or more peaks, troughs, points of inflection, or so on, at one or more angles, in measured spectra. These could be absolute measured values, or indicative values, for example the 2D location of the peaks or troughs, or the number of peaks or troughs at a given angle, or number of angles. The unique identifier may depend on the nature and level of security that is required.

FIG. 11 depicts a slightly different methodology to that shown with reference to FIG. 10, where in FIG. 11 the orientation of a reader is changed with respect to the security element and associated filter system.

FIG. 11 shows a substrate or other object 130 onto which is placed or otherwise located a security element 132. In this Figure, a filter system 134 is located on top of the security element 132, and may even form a part of that security element 132 in some form of composite or laminate structure or similar. Again, an electromagnetic radiation source 136 is used to irradiate 138 the security element 132. In this case the irradiation also takes place via the filter 134. A reader 140 is provided for reading the security element 132, optionally via a broadband filter 142 which may be used to reduce noise or similar. A reading may initially be undertaken at a first angle 144, where the reading is undertaken normally (perpendicularly) with respect to the filter 134 and element 132.

As with the system shown in FIG. 10, the angle of orientation of the filter 134 with respect to the reader 140 is controllable by one or more appropriate servo or stepper motors or other drivers or controllers. The element-filter 132, 134 combination could be oriented as required, and/or the reader 140 could be oriented as required. However, it might be simpler, easier or simply more convenient and more flexible to avoid the need for such control, and to instead actively determine the angle of orientation 144 via analysis of a designated feature 148 associated with one or both of the filter 134 and/or security element 132. For instance, this might be a dedicated alignment marker, the relative orientation or distortion of which can be used to determine the angle or angles of orientation of the marker 148 and thus the filter 134 and/or security element 132 relative to the reader 140. A reflective or holographic grating could alternatively or additionally be used, the properties of radiation emitted or otherwise reflected or similar by the grating being used in determining the angles of orientation. A designated feature might be a designated alignment marker that is completely separate to any other component, functional or otherwise, of the security element 132 or overlying filter 134. Alternatively or additionally, the designated feature might be part of a label provided on the filter 134 or security feature 132 or somehow associated therewith. For instance, the security element 132 might be provided with or be otherwise associated with a brand name or a label, or similar, and one or more features of that brand name or label or logo can be used to determine the orientation of the filter 134 or security element 132 based on determined distortion orientation or similar of that designated feature. Any marker from which angle variation can be determined may be used. The angle calculated might also be used to correct for distortion in the read shape or map of the element.

Although finding advantageous use in the present invention, in terms of the freedom that such a feature might provide for use in determining degrees or angles of orientation, further detail on such markers are not provided herein, since such used and related processing is already known in fields such as those detailing or relating to QR codes and similar.

The reading, in combination with the determination of the angle, is used to determine a map 150 (e.g. a spectrum) of emission energies versus intensities at that first angle 144.

Further maps 152, 154 may then be established at different orientation angles 156, 158, the determination of those different angles being possible via the calculation of the degree of distortion 160 of the designated feature 148 as already described above.

FIG. 12 shows how a number of different maps 170 obtained relative to specific orientations of the filter system (e.g. those shown with reference to FIG. 10 or 11), may be combined into an overall map 172 of emission energy (wavelength) versus intensity at different positions or locations across the security element, and at different angles of reading relative to the filter system/different angles of the filter system.

The same Figure shows a grid or array 174 which might reflect, be indicative of, or actually equate to an array of pixels in a 2D sensory array—e.g. that used to read the maps 170. This might also be another way of visualising a map 172. For a particular pixel, group of pixels, or map point 176, a plot 180 is shown which represents how the emission energy (wavelength) versus intensity varies at different orientation angles of the filter 182 for the location in the map (and thus location of the security element). It will be appreciated that the width of each energy band at each orientation angle corresponds to the bandwidth or notch or pass wavelength or wavelengths of the filter system at that particular angle of orientation. This principle can be used in a number of different ways, for instance using a very narrow band pass filter at a large number of different orientations to build up a continuous energy spectrum as shown on plot 180, or to determine the emission spectra at discrete points. A broader or wider transmission band might not resolve the emission spectrum in as much detail, but could nevertheless still be useful.

It will be appreciated that the actual measured data could be the unique identifier that is drawn from the map, for example the spectrum at a particular location and at a particular orientation angle of the filter system, or similar. Perhaps more generally, the read or determined data might generally be described as being indicative of an optical property of the security element. It may be indicative in that it might be an actual optical property of the security element, for example a particular wavelength of intensity at that wavelength or energy or similar. Alternatively or additionally, the data indicative of the optical property might be one or more portions of an emitted electromagnetic spectrum of at least a part of the security element. Alternatively or additionally, the data indicative of an optical property might be a peak, trough, or point of inflection in an electromagnetic emission spectrum or at least a part of the security element. Alternatively or additionally, the data may be even more representative, and for example be or equate to a physical location in relation to the security element of an actual optical property, or a physical location of a peak, trough, or point of inflection in an electromagnetic emission spectrum of the security element in relation to the security element. The unique identifier could be the number of peaks at a certain angle, or the number of troughs. Generally, then, the data could be actual data of one or more read features, or representative data, such as a location or count of such features. Features could be read values that do, or do not, exceed a certain value, or which equate to a certain value. That is, the data that is read or obtained or used to provide the unique identifier could be actual absolute measured values, or could be something that is derived from such measured values. Any and all of this can be used to provide a unique identifier, since, as described above, each mapping will be unique to the type and nature of emitters and associated emissions of components forming the security element.

The maps 170, 172 shown in and described with reference to FIG. 12 may be stored in an online database, or some other storage medium, so that the database and the maps within can be later accessed for use when subsequently authenticating the security element, for example when the security element is in use and being used to label or identify or otherwise secure an object which the security element is attached or similar. The maps may be stored in a secure location, so that access to the maps is restricted.

Once the map of emission energy and intensity as a function of orientation angle of the filter is established (or at least a portion is established), this map can then subsequently be used to authenticate the security element, during a subsequent reading of the security element. Briefly, if a reading of a security element does not reveal a unique identity derived from an already determined map that is present in the database, or match a particular entry in the database, then the security element might not be deemed as authentic.

The reading of the security element for authenticating purposes might be much the same as already described above in relation to previous methods and systems. The difference when authenticating is that there will already be a pre-established or determined map to compare newly read data with.

When it comes to authenticating a security element, a request or related information from a database (or controlling software) might be sent to a consumer or end-user, or their reader, for undertaking the authentication. This might, of course, be largely transparent to the user. The user might simply be asked to point the camera of the mobile device at a security element at a particular angle, or range of angles, for example taken in the form of a short video, series of photos or similar. The user might simply be asked to point the camera of the mobile device, and the or any reading at the angle of reading then compared with the mapping in the database. That is, the user might not actually be asked to use a particular reading angle. Instead, this might be left to chance or choice of the user. The user might not be aware of the mechanisms underpinning the authentication described herein.

In a related example, data from a database representing entries in the map might not need to be sent to the reader of the end-user or consumer. Instead, when authentication is required, the reader of the end-user or consumer might be internally or externally prompted to simply undertake the above methodology for determining optical properties of the security element at a range of angles, or at a particular angle. Once this has been undertaken as described above, this data could then be anonymised and sent back to the database or controlling software for comparison with entries within that database. If these entries match, the database might simply provide identifying location signal or message back to the user or consumer.

In a related example, the database might send a unique identifier from a stored map, and this is simply looked for at the reader end. For example, the database might send data indicating that X peaks are expected at angle A, Y peaks are expected at angle B, and Z peaks are expected at angle C, and so on. If one reading matches one of these identifiers, the element may be deemed authentic. Alternatively or additionally, something like a hash function could also be used to abbreviate and/or anonymise the (more complex) map The mapping across different configurations might allow for tiered or more robust security. For example, the unique identifier might be based on features across or within a map at a given angle, and/or across or between angles. In a crude and random example, the unique identifier might be based on there being a peak A at location B and angle C, and there being D peaks at angle E, and there being a change in number of peaks from F to G with a change in angle from H to I. Again, the power is in the mapping being across different angles (configurations), to give a very rich map for possible unique identifier determination.

In one example, FIG. 13 shows how some sort of request may be made or prompted for an end-user to optically read the security element for identification purposes at a subset of angles 200, 202, which will correspond to probing different parts of the (previously mapped) emission spectrum 204. At one or both of these angles 200, 202, there may be a unique map of optical properties across the security element, and this read by a 2D sensor of the reader as shown by an array or map 206. Black dots in that array 206 may indicate where, at a particular angle 200, 202 or even a combination of those angles 200, 202, a particular optical feature is present. As discussed above, this may be an absolute measured value of the optical feature, or could be simply the location of an emission peak, and emission trough, a plateau, a point of reflection, or similar.

The entire measured data set could then be transmitted to a database 210 or controlling software, which stores the mapped optical properties measured previously at the different angles, described above. Alternatively, only particular data may be transmitted, for example the physical location of the particular optical features as discussed above, for example the location of peaks, troughs, points of inflection and so on. This latter example might reduce an amount of data that needs to be generated and/or received. For example, it might be far simpler, easy and quicker to transmit the pixel locations, map locations, or physical locations, (all of which are related to one another) where peaks are detected, than it would be to transmit the entire spectrum across the security element for the different measured angles. Or, the hash (or similar) of this data, could be transmitted, as discussed below.

FIG. 14 schematically depicts methodology for optically reading and verifying a unique identifier associated with the security element. Initially, a user chooses or is instructed to choose a random subset of angles for which optical measurement is to take place 220.

Depending on the setup, the user may choose how the measurements are to be undertaken, or be forced by availability of hardware into a particular choice 222. That is, the user may be able to vary the orientation angle between a reader of a security element, and the filter that is attached to or provided with the security element, or may be able to independently vary the angle of the filter that is moveable separately to one or both of the security element and/or reader, or described above.

The optical reading then takes place at the different angles 224.

Once obtained, output data may be anonymised into, for example, a 1D key with an appropriate algorithm (for example a hash function or similar) 226.

This data may then be corrected for environmental noise and other factors, for example using a fuzzy extractor or similar 228.

The user (which includes the reader used by the user) will then announce the angles and possibly band pass filter that were used for the measurement 230. "Announce" does not necessarily mean that the user has to actually calculate and be aware of the angles and/or band pass filter that has been used. This is likely to all happen in the background, largely transparent to the user. The angles can be determined as discussed above. The type of band pass filter could be known in advance, or optically read via a marker or similar on the band pass filter. It might even be possible to determine the type or nature of band pass filter on-the-fly, e.g. to determine the characteristics of the band pass filter from the measurements that have been taken. It might be possible for the read data to still be useable in some way for comparison with predetermined maps, without knowing exact details of the filter used in the reading. For example, even if intensities are different, there might always be an emission peak at wavelength X, in general location Y, and angle Z, and so on. This sort of coarse data might still be useful in determining a unique identifier.

The information is then transmitted to the database which automatically selects the data that is needed for comparison with the measured data, for example based on the announced angles 232.

The calculated data is then put into a similar algorithm (e.g. hash function) as used to minimise the measured data, to create a similar 1D key 234.

The two extracted 1D keys are then compared to one another, and if they agree then the security element is verified as being authentic 236.

Error margins may vary depending on the security requirements, for example with perhaps larger error margins being allowed for less robust security requirements, and being tighter for more secure environments. Hash functions generally don't allow for margins of error—if input data is changed even slightly then the output should be randomly different. Error correction therefore likely has to be done prior to hashing, by some form of smoothing, or approximating of the data. Another possibility is sending information about features/sections of the security element (e.g. the map data or unique identifier data) hashed separately, and authenticating based on partial success, e.g. one of the hashes passing a comparison test or similar.

FIG. 15 depicts perhaps more general methodology for determining an identifier for a security element.

The method comprises optically reading the security element via a configurable optical filter system, a readable optical transmission property of the filter system 240 varying with respect of the configuration of the system.

The reading comprises determining data indicative of an optical property of the security element at a first configuration of the system, and determining data indicative of an optical property of the security element at a second, different configuration of the system 242.

The unique identifier is determined from a map of the variation in determined data indicative of a property in respect to the configuration of the filter system 244.

In all practical likelihood, the reading will be undertaken for multiple locations across the security element at the or each configuration of the filter system, such that the map is a map of the variation in determined data indicative of the optical property across the security element with respect to the configuration of the filter system 246.

In all practical likelihood, the reading for multiple locations of the security element is likely to be undertaken in a single reading step, using a reader with a 2D sensor 248.

FIG. 16 depicts a general system for determining the unique identifier for a security element 250. The system comprises a configurable optical filter system 252, a readable optical transmission property of the filter system 252 varying with respect to configuration of the filter system 252. The overall system also comprises an optical reader 254, for optically reading the security element 250 via the optical filter system 254. The reading comprises determining data indicative of an optical property of the security element 250 at a first configuration of the filter system 252, and determining data indicative of an optical property of the security element 250 at a second, different configuration of the filter system 252. The unique identifier is determined from a map of variation in determined data indicative of an optical property with respect to the configuration of the filter system 252.

Although, strictly speaking, not essential, in practice the reader 254 is highly likely to be arranged to undertake readings from multiple locations across the security element 250 at the or each configuration of the filter system 252, such that the map is a map of the variation in determined data indicative of an optical property across the security element 250 with respect to the configuration of the optical system 252.

Again, although not essential, in practice it is highly likely that the reader 254 will comprise a 2D sensor 256 for reading multiple locations across the security element 250 in a single reading step.

In other words, in another embodiment it may not be necessary to read across multiple locations, and/or undertake such readings in a single step. For example, reading at one or more discrete locations might be satisfactory, for example at one or more particular locations of the security element. The readings could be undertaken at one or more, but not all, locations at a time. A one dimensional sensor may be satisfactory, for example reading across or along a line (e.g. row or column or diagonal) of locations of the security element, as opposed to across the element in two dimensions. A sensor that can only read a single location may also be satisfactory, even if used on multiple occasions to take readings across the element. A two-dimensional sensor may simply be more effective and efficient for taking multiple readings across the element, and is the sort of sensor typically found in mobile devices as described herein. That is, specialist equipment is not required.

FIG. 17 schematically depicts a general method of authenticating. The method comprises optically reading a security element via a configurable optical filter system, a readable optical transmission property of the optical system varying with respect to a configuration of the filter system 260.

The reading comprises determining data indicative of an optical property of the security element at the configuration of the filter system 262.

The authenticating further comprises comparing 264 determined data indicative of an optical property with the unique identifier determined using the method or system of FIG. 15 or 16. The determined data may itself be a unique identifier, such that the unique identifier read at the authentication stage is compared with a previously determined unique identifier.

Related to the method of FIG. 17 is a general authentication or authenticating system, as shown in FIG. 18. The system comprises a configurable optical filter system 270, a readable optical transmission property of the filter system varying with respect to a configuration of that filter system 270. An optical reader 272 is also provided, for optically reading a security element 274 via the optical filter system 270.

The reading comprises determining data indicative of optical property of the security element at a configuration of the filter system 270. The overall system is arranged to compare the determined data indicative of an optical property with the unique identifier determined using the method or system of FIG. 15 or 16.

Again, although not essential, in practice it is highly likely that the reader 274 will comprise a 2D sensor 276 for reading multiple locations across the security element 270 in a single reading step.

FIG. 19 schematically depicts a security element for use in accordance with the methods and systems described above. The security element comprises a first part 280 suitable for emitting electromagnetic radiation, as described above. For instance, the first part 280 may comprise one or more continuous or discrete components, particularly in the form of one or more continuous or discrete components capable of emitting electromagnetic radiation as a result of, or associated with, quantum mechanical confinement exhibited by those one or more components.

The security element also comprises a second part, in the form of an optical filter system 282, a readable optical transmission property of the filter system 282 varying in respect to a configuration of the filter system (e.g. inherently, or relative to a reader of the security element). The first part 280 is readable via the second part 282. The first part 280 may be attached to or form part of an object 284. The object 284 might be part of the security element, for example a substrate or support for the first part 280, or might be a separate object, to which the security element is attached for use in authentication.

It has been discussed above how the invention is based on optically reading the security element via a configurable optical filter system, a readable optical transmission property of the filter system varying with respect to a configuration of the filter system. This, of course, covers the filter being orientated with respect to the reader, but also includes the reader being oriented with respect to the filter. In either example, a readable optical transmission property of the filter system varies with respect to a configuration of the filter system—i.e. its angle relative to the reader.

It might be useful, and easier, to use the same sort of filter when determining the map or identifier for the first time (e.g. in a laboratory, factory, or test environment), as when undertaking the authenticating the security element at some later time. However, this might not be possible or practical.

So, the initial determination of the map or identifier might be undertaken for more than one filter, to establish a number of different possible maps, or offsets for a give map for each filter. When one of these filters is then used in an authentication process, it will still be possible to correlate the measurement for authentication with the measurement for the initial determination. Indeed, it might even be possible to not know what filter is being used, and still be able to determine if the security element is authentic from relative changes optical properties at different angles, even if undertaken in a coarse (and perhaps less secure) manner. For example, the presence of peaks in a general location at one angle, and then at a general location at another angle, might be enough for authentication purposed. However, knowing the type or nature of filter will allow for a far more secure process, since more useful information can be obtained and processed. It might well be that the properties of the filter could be obtained from an incidental background reading using ambient light, or a via a deliberate calibration step.

The filter system described above is something of a deliberate filter system, where a dedicated filter has been used to obtain the required measurements. That is, the filter system is separate from the device, or added to the device at a later stage. It might be possible to implement the above methodology using filtration principles already existing in a device, for example due to the presence of ultra violet or near infrared filters present on lenses or sensors of existing readers. Such incidental filtering might not have the flexibility of the deliberate, dedicated filters systems described above.

Following on from at least the preceding paragraph, it is worth noting that in all embodiments, taking a reading through the configurable filter system is always discussed. It is such a reading, and general approach, which allows the benefits of the invention to be realised, of course. It is therefore clear that even a single reading, at a single given configuration, is still inventive for the reasons already discussed at length above, because the filter system is configurable (even if not always used at different configurations) to facilitate an increase in a richness or depth of a map, and/or configurable to take advantage of a previously obtained map. Also, this is consistent with a single reading at a single configuration being used to compare with (e.g. authenticate via) a map that might well have been built on multiple readings at multiple locations. That is, it is the configurable filter system that is key, even if readings are not undertaken at different configurations in all examples. Whilst multiple readings may be used to establish a rich or deep map, these can clearly (as above) be undertaken with single readings, undertaken at single, different configurations. So, a system and method for undertaking such a single reading at a single configuration, facilitates this. Such use of a configurable filter system has not been contemplated previously.

The security element described herein does not necessarily need to be shown, marked or advertised as such. The element could be discretely located on, alongside, on or within an object for which authentication is required. The element could be applied when the object is made, or retrospectively.

The security element described herein generally functions as an optically readable physical unclonable function.

Determining of a unique identifier, or other information, might comprises defining, obtaining, checking, confirming, or so on, that unique identifier, or other information.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of determining a unique identifier for a security element, the method comprising:
   irradiating the security element with electromagnetic radiation from a broadband light source;
   optically reading radiation from the security element that is emitted in response to the electromagnetic radiation from the broadband light source via a single configurable optical filter system, wherein a readable optical transmission property of the single configurable optical filter system varies with respect to one of: an adjustable angle of orientation of the single configurable optical filter system, a temperature of the single configurable optical filter system, or an electric field across the single configurable optical filter system;
   the reading of the radiation comprising determining data indicative of an optical property of the security element at a first configuration of the single configurable optical filter system; and
   the unique identifier being determined from a map of a variation in determined data indicative of an optical property with respect to the configuration of the single configurable optical filter system;
   wherein the reading is undertaken for multiple locations across the security element at each configuration of the single configurable optical filter system, such that the map illustrates variation in determined data indicative of an optical property across the security element with respect to the configuration of the single configurable optical filter system; and
   wherein the reading for multiple locations across the security element is undertaken in a single reading step, using a reader with a two-dimensional sensor.

2. The method of claim 1, wherein the data indicative of an optical property of the security element comprises one or more of:
   an actual optical property; and/or an electromagnetic emission spectrum of at least a part of the security element; and/or a peak, trough, or point of inflection in an electromagnetic emission spectrum of at least a part of the security element; and/or a physical location in relation to the security element of an actual optical property; and/or a physical location of a peak, trough, or point of inflection in an electromagnetic emission spectrum of the security element in relation to the security element.

3. The method of claim 1, wherein the security element comprises one or more continuous or discrete components exhibiting quantum mechanical confinement, each component being capable of emitting electromagnetic radiation linked to that quantum mechanical confinement, wherein the confinement of the one or more continuous or discrete components confines in one or more of 3D, 2D, or 1D, or 0D, and wherein in a first configuration: radiation from a first continuous or discrete component is optically readable while radiation from a second continuous or discrete component is not optically readable; and in a second configuration: radiation from the first continuous or discrete component is not optically readable while radiation from the second continuous or discrete component is optically readable.

4. The method of claim 1, wherein one or both of the security element and/or single configurable optical filter system comprises, or is associated with, a designated feature, for use in determining an angle of orientation of the reader with respect to the security element and/or optical filter, wherein the designated feature optionally comprises an alignment marker or a diffraction grating.

5. The method of claim 1, wherein the single optical filter system comprises one or more of a band pass filter, an edge filter, a notch filter or a tuneable Bragg grating in a fibre, and/or wherein the optical transmission property is a central transmission wavelength or transmission band.

6. The method of claim 1, wherein the reader is a handheld mobile device, or a wearable mobile device, and wherein the broadband light source is contained in the handheld mobile device or the wearable mobile device.

7. The method of claim 1, wherein the map, or a unique signature derived from the map, is stored in a secure location, for use in authentication of the security element on a subsequent reading of that security element.

8. The method of claim 1, further comprising, after determining the unique identifier for the security element:

additional optically reading of radiation from the security element in response to additional irradiation of the security element with electromagnetic radiation from the broadband light source, to yield additional determined data indicative of the optical property;

comparing the additional determined data indicative of the optical property with the unique identifier; and authenticating the security element, based on the comparing.

9. The method of claim 8, wherein the reader is further arranged to compare the additional determined data indicative of the optical property with the unique identifier to authenticate the security element.

10. The method of claim 1, wherein the reading further comprises determining data indicative of the optical property of the security element at a second, different, configuration of the filter system.

11. The method of claim 1, wherein the single configurable optical filter system varies solely with respect to the temperature of the single configurable optical filter system, and wherein the first configuration includes a first temperature of the single configurable optical filter system.

12. The method of claim 1, wherein the single configurable optical filter system varies solely with respect to the electric field across the single configurable optical filter system, and wherein the first configuration includes a first electric field across the single configurable optical filter system.

13. The method of claim 1, wherein the readable optical transmission property includes one of a wavelength or a polarisation.

14. The method of claim 1, wherein the broadband light source comprises a flash light source.

15. A system for determining a unique identifier for a security element, the system comprising:

a single configurable optical filter system, an optical transmission property of the single filter optical system varying with respect to one of: an adjustable angle of orientation of the single configurable optical filter system, a temperature of the single configurable optical filter system, or an electric field across the single configurable optical filter system;

an optical reader, for optically reading radiation from the security element via the single configurable optical filter system in response to irradiation of the security element with electromagnetic radiation from a broadband light source;

the reading comprising determining data indicative of an optical property of the security element at a first configuration of the single configurable filter system; and the unique identifier being determined from a map of a variation in determined data indicative of an optical property with respect to the configuration of the single configurable filter system;

wherein the reader is arranged to undertake readings for multiple locations across the security element at the or each configuration of the single configurable filter system, such that the map illustrates the variation in determined data indicative of an optical property across the security element with respect to the configuration of the single configurable filter system; and wherein the reader comprises a two-dimensional sensor for reading multiple locations across the security element in a single reading step.

16. The system of claim 15, wherein the single configurable optical filter system varies solely with respect to the temperature of the single configurable optical filter system, and wherein the first configuration includes a first temperature of the single configurable optical filter system.

17. The system of claim 15, wherein the broadband light source comprises a flash light source.

18. A security element for authentication of an article, wherein the security element comprises:

a first part, having a material which emits electromagnetic radiation in response to irradiation with electromagnetic radiation from a broadband light source;

a second part, comprising a configurable optical filter system for detecting the electromagnetic radiation emitted from the material in the first part, a readable optical transmission property of the filter system varying with respect to one of: an adjustable angle of orientation of the single configurable optical filter system, a temperature of the single configurable optical filter system, or an electric field across the single configurable optical filter system, the electromagnetic radiation of the first part being within a detectable range of the configurable optical filter system of the second part.

19. The security element of claim 18, wherein the single configurable optical filter system varies solely with respect to the adjustable angle of orientation of the single configurable optical filter system.

20. The security element of claim 18, wherein the single configurable optical filter system varies solely with respect to the electric field across the single configurable optical filter system.

21. The security element of claim 18, wherein the broadband light source comprises a flash light source.

\* \* \* \* \*